Patented Mar. 11, 1947

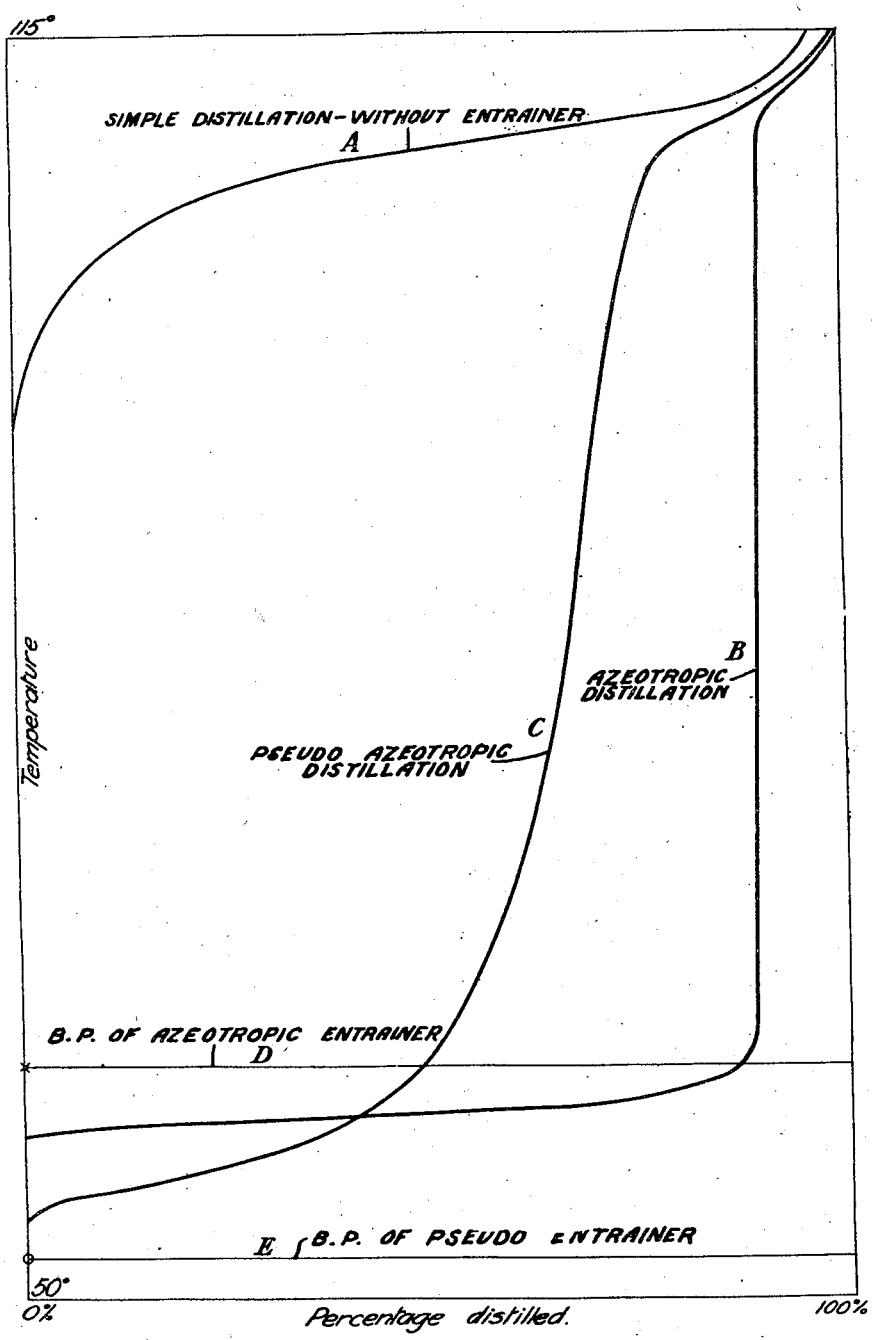

2,417,355

UNITED STATES PATENT OFFICE 2,417,355

DISTILLATION OF HYDROCARBONS WITH ADDITION OF ACETONE-METHYL ALCOHOL

George Anthony Dummett and Sydney Jamieson Ralph, London, England, assignors to The Aluminum Plant & Vessel Company Limited, Wandsworth, London, England Application June 9, 1941, Serial No. 397,334
In Great Britain May 10, 1940

2 Claims. (Cl. 202—42)

This invention relates to the treatment by distillation of complex mixtures, particularly complex mixtures of hydrocarbons or their derivatives, which are not resolvable by ordinary methods of distillation into their individual components.

The invention is applicable to various complex mixtures of the nature referred to but is more particularly concerned with the separation of paraffins, naphthenes and unsaturated hydrocarbons from aromatic hydrocarbons or mixtures of the same.

Non-destructive distillation processes as at present carried out may be divided into those where a constant boiling point mixture is formed or not formed. Processes falling in the former class are termed "azeotropic" distillations, and those falling in the latter class are known as "simple" distillations. In processes falling within the latter class, the boiling point of any mixture lies between those of the lowest and highest boiling components. Also, the vapour is always richer in the most volatile component than the liquid with the result that the composition of the mixture is continually being changed. That is to say, as distillation proceeds, the liquid becomes progressively denuded of the lower boiling components in the order of their relative volatilities. Thus, the Engler distillation curve shows a progressive rise from some temperature above that of the boiling point of the most volatile component to below that of the boiling point of the least volatile component. Furthermore, in a given distillation unit, the composition of the distillate will depend upon the composition of the liquid at the base of the column and on the reflux ratio. It will be appreciated that the higher the concentration of the most volatile component at the base the higher will be the concentration in the distillate for a given reflux ratio and, the higher the reflux ratio, the higher will be the concentration of the most volatile component in the distillate for a given concentration in the liquid at the base of the column.

In processes involving the distillation of mixtures which form constant boiling point mixtures of the minimum boiling point type, however, different considerations arise. Firstly, at any given pressure there exists a mixture of a definite composition which boils unchanged at a definite boiling point and in which the vapour phase is identical in composition with the liquid phase with which it is in equilibrium, secondly, the boiling point of the constant boiling mixture is below that of any of the components of the mixture and, thirdly, liquids having a composition lying between that of the constant boiling mixture and another component behave as though the constant boiling mixture were a pure component and distil accordingly. It follows, therefore, providing that the apparatus and method of operation are sufficiently efficient to separate the constant boiling mixture alone from such mixtures, that it will first be removed at the head of the column until virtually all of one of its components is exhausted. During this time, the temperature remains substantially constant and below the boiling point of all of the pure components or mixtures of the same and, thereafter, the temperature rises rapidly to the normal boiling point of the remaining mixture and the remainder distils as a simple mixture. In cases where more than one constant boiling mixture is formed, these distil in order of their relative volatilities. For example, in the case of mixtures of benzene, ethyl-alcohol and water, if an excess of benzene and ethyl-alcohol is present, there is obtained (1) the ternary constant boiling mixture of benzene, alcohol and water at 64.85° C. until the water is exhausted, (2) the binary constant boiling mixture of benzene and alcohol at 68.25° C. until the benzene or alcohol is exhausted, and (3) benzene or alcohol alone according to which ever is in excess. Alternatively, if there is an excess of water present, there is obtained (1) the ternary constant boiling mixture of benzene alcohol and water at 64.85° C. until the benzene is exhausted, (2) the binary constant boiling mixture of ethyl-alcohol and water at 78.15° C. and (3) pure water at 100° C. In practice, some intermediate fractions are formed to a greater or less degree between the various constant boiling mixtures depending on the relative volatilities of the constant boiling mixture and the pure components and the fractionating efficiency of the column.

Distillation processes falling within the class of azeotropic distillations as defined above, are frequently used in order to obtain the selective resolution of components which cannot be separated or can only be separated with great difficulty by ordinary means. For example, alcohol and water are inseparable by simple distillation owing to the formation of a constant boiling mixture. If, however, benzene or hexane or trichlor-ethylene is added in suitable proportion the water is removed entirely in the ternary constant boiling mixture and the pure alcohol remains behind. Again, certain paraffins and naphthenes together form constant boiling mixtures and are therefore inseparable by simple distillation. If, however, acetic acid is added, constant boiling mixtures are formed between it and both types of hydrocarbons, the mixture with the paraffins having the greater volatility and distilling over preferentially eventually leaving a naphthene-acetic acid mixture behind. In practice, such added substances are known as entraining agents. Such azeotropic distillation processes may be characterised in this that, prior to or during distillation, of a mixture inseparable (or only with difficulty separable) by simple distillation into its components, a substance is added which, under the conditions prevailing during distillation, results in the formation with one component of a mixture of constant boiling point and of constant composition at a given pressure, i. e., a true azeotrope. In this way, the isolation of the components of the original mixture becomes possible. Examples of such processes are given above.

Now, according to the present invention, there is provided an improved form of distillation treatment which may be termed "pseudo-azeotropic" and which is characterized by the addition to the mixture of an entraining agent, which, under the conditions prevailing during distillation, possesses the property of differentially affecting the relative volatilities of the components of the mixture without forming a true constant boiling point mixture.

More specifically, the invention may be regarded as consisting in a process of carrying out the distillation of complex mixtures, particularly complex mixtures of hydrocarbons, their derivatives or the like which is characterized by the feature that an entraining agent differing chemically from the complex mixture, is added to the complex mixture so that, under the conditions prevailing during distillation, the relative vapour pressures of the components of the complex mixture are modified in such a manner that at least one component distils with the entraining agent and leaves behind another component or other components of the complex mixture but without forming true azeotropes during distillation. In this manner, components of a single type in pure or reasonably pure condition or a mixture of components resolvable by simple fractional distillation may be obtained either as a distillate or a residue. Such distillations are characterised by the fact that a greater entraining efficiency as regards the volume of entrainer required to remove a given volume of selected component is obtained by carrying out the distillation under conditions normally considered as inefficient in either simple or azeotropic distillation. That is to say, the distillation is rendered more effective as regards the volume of selected component removed by a given volume of entraining agent, by reducing the reflux ratio or the volume of entrainer present or both. The entraining agent is preferably added continuously during the distillation and the distillation may be carried out under reduced or increased pressure.

The nature and the quantity of the entraining agent used will depend upon the characteristics of the component or components to be separated or isolated. Thus in the separation of relatively non-polar organic liquids we should select an entrainer of a highly polar type. Thus it has been found that a mixture of acetone and methyl alcohol in the proportions of their azeotropic mixture is a satisfactory entraining agent for the pseudo-azeotropic distillation of such hydrocarbon mixtures.

Also, in some instances, the pseudo-azeotropic distillation above referred to may be followed by true azeotropic distillation with another entraining agent. In the case of a non-aqueous distillate, the distillate may be treated with water for the separation of its components.

In carrying the invention into effect according to one convenient mode, a mixture having a boiling range of 95 to 125° C. and containing say about 60% of aromatic hydrocarbons mixed with paraffins, naphthenes and unsaturated hydrocarbons and inseparable by simple distillation, is distilled with the continuous addition thereto of an entraining agent consisting of about 1.5 to 2 volumes of an acetone-methyl alcohol azeotrope, at the very low reflux ratio of about 1.5 to 1 and at about 56° to 59° C. distilling range and so as to obtain a heads fraction of very high paraffin content. Such distillate on mixing with water or salt solution gives an oil equal to about 25% of the volume of the original mixture and contains about 85% of paraffins and naphthenes. It has been found that such a mixture of entrainer with hydrocarbons which are of similar volatility distils substantially as a mixture of three components, i. e., entrainer, hydrocarbons of low density and hydrocarbons of high density. The distillation proceeds in the following order: entrainer plus hydrocarbons of low density without almost no hydrocarbons of high density followed by hydrocarbons of low density plus hydrocarbons of high density. If the relative volatilities of the two types of hydrocarbons were not altered, it would be expected, owing to the wide difference in boiling points, that the distillation would proceed in the following order: almost pure entrainer but with small amounts of hydrocarbons both of low density and of high density together, followed by a mixture of the two types of hydrocarbons without appreciable resolution of its components. If, however, the entrainer formed constant boiling mixtures of different volatilities with both types of hydrocarbons, it would be expected that the distillation would yield a constant boiling mixture of entrainer and hydrocarbons of low density, followed by a constant boiling mixture of entrainer and hydrocarbons of high density and leave a residue of hydrocarbons of high density or entrainer whichever is in excess.

We have also found that it is not necessary to use pure compounds as entraining agents, but that those ordinarily obtainable of 90–95% purity are generally suitable. Equally effective are entraining bodies recovered by simple distillation from the decanted water layer, resulting from the mixing referred to above, and which may contain up to 10% of water in the case of the acetone methyl alcohol azeotrope, for example.

By first adopting this pseudo-azeotropic method of distillation, it is possible to obtain separations more economically than by using a truly azeotropic distillation process, because a lower reflux ratio with consequent steam economy is obtained, together with in some cases a more selective separation of those components of the mixture which cause difficulty in other distillation processes.

That the process of distillation produced according to the present invention is pseudo-azeotropic in the sense defined above, is clear from a comparison of the shape of the Engler distillation curves. Using a standard apparatus and method of procedure, distillation curves may be obtained showing distilling temperature plotted against the percentage distilled.

For example, in the accompanying drawing such curves are shown for three types of distillation of the same hydrocarbon mixture.

Curve A represents the simple distillation of the mixture without added entraining agents.

Curve B represents the distillation of the mixture in the presence of an entraining agent with which constant boiling point mixtures of the minimum boiling point type are formed. D is a line indicating the boiling point of the entrainer. It will be seen that the temperature remains below that of the boiling point of the entrainer until practically all the entrainer is distilled off when the temperature rises sharply to the normal boiling point of the remaining constituents of the mixture. Such a curve is typical of azeotropic distillation.

Curve C represents the distillation of the mixture in the presence of another entraining agent of the type referred to in this specification. E is a line indicating the boiling point of this entrainer. It will be seen that the temperature rises steadily from a point above the boiling point of the entrainer. At no point in the curve is there a sudden increase in temperature typical of the complete removal of entrainer. The exhaustion of entrainer in this case is gradual. Such a curve is typical of pseudo-azeotropic distillation, as above defined.

Complex mixtures of the class described are hereby defined as mixtures of liquids which are inseparable by simple distillation, and mixtures of liquids which are separable only with difficulty by simple distillation.

We claim:

1. A process wherein a mixture having a boiling range of 95 to 125° C. and containing about 60% of aromatic hydrocarbons mixed with paraffins, naphthenes and unsaturated hydrocarbons and inseparable by simple distillation, is distilled with the continuous addition thereto of an entraining agent consisting of about 1.5 to 2 volumes of an acetone-methyl alcohol azeotrope, at a low reflux ratio, whereby a head fraction of very high non-aromatic content is obtained.

2. A process according to claim 1 wherein the treatment is followed by true azeotropic distillation with another entraining agent.

GEORGE ANTHONY DUMMETT.
SYDNEY JAMIESON RALPH.

REFERENCES CITED

The following references are of record in the file of this patent:

UNITED STATES PATENTS

| Number | Name | Date |
|---|---|---|
| 2,212,810 | Feld | Aug. 27, 1940 |
| 2,168,691 | Voorhees | Aug. 8, 1939 |
| 2,085,546 | Poelpema | June 29, 1937 |
| 1,919,752 | Schmidt et al. | July 25, 1933 |
| 2,265,220 | Sullivan, Jr. | Dec. 9, 1941 |
| 2,290,636 | Deanesly | July 21, 1942 |
| 2,050,513 | Van Peski et al. | Aug. 11, 1936 |
| 2,085,287 | Bailey | June 29, 1937 |
| 2,231,241 | Bailey | Feb. 11, 1941 |
| 1,079,004 | Golotez | Nov. 18, 1913 |
| 2,288,126 | Dunn et al. | June 30, 1942 |
| 2,319,694 | Lee et al. | May 18, 1943 |

FOREIGN PATENTS

| Number | Country | Date |
|---|---|---|
| 476,610 | British | 1937 |

OTHER REFERENCES

Journal of Research of the National Bureau of Standards, vol. 27, No. 1, pages 44 to 63, pages 44 to 50, relied upon.

Proceedings of 21st Ann. Meeting American Petroleum Institute, section III, Refining, Nov. 11, 15, 1940, pages 43 to 47.